Patented Mar. 11, 1952

2,588,334

UNITED STATES PATENT OFFICE 2,588,334

SOLUTIONS OF ACRYLONITRILE POLYMERS IN NITROMETHANE AND ALPHA-HYDROXY - BETA - TRICHLOROPROPIONITRILE

Masten Rufus Dalton, Charlotte, N. C., assignor to American Viscose Corporation, Wilmington, Del., a corporation of Delaware No Drawing. Application November 9, 1950, Serial No. 194,932

4 Claims. (Cl. 260—32.4)

This invention relates to new compositions comprising solutions of acrylonitrile polymers, including homopolymers, copolymers, and interpolymers.

This application is a continuation-in-part of my pending application Serial No. 770,557, filed August 25, 1947, and now abandoned.

In the United States Patents Nos. 2,404,714 to 2,404,727, inclusive, it is proposed to dissolve acrylonitrile polymers in certain organic materials, including dimethyl formamide, dimethyl methoxy acetamide, hexamethylene imine, butadiene cyclic sulphone, tetramethylene cyclic sulphone, p-phenylene diamine, and the m- and p-nitrophenols.

All of those organic materials proposed for use in the preparation of solutions of the acrylonitrile polymers possess the extremely important disadvantage that they are swelling agents for the polymers at ordinary temperatures and, due to their pronounced swelling action on the acrylonitrile polymers under ordinary temperature conditions, colorless or substantially colorless and homogeneous solutions of the polymers therein can be obtained only with difficulty and under special conditions.

The most practical and commercially acceptable method of producing useful spinning, casting, coating, or the like, solutions of polymeric materials involves the steps of dispersing the polymer, in particulate form, in the solvent at ordinary or room temperature, and then effecting complete dissolution of the polymer by continued stirring of the dispersion at either ordinary or moderately elevated temperatures not higher than about 100° C. Because of the pronounced swelling effect which the mentioned organic materials exert on the acrylonitrile polymers, it is impossible to use that preferred method in preparing solutions of the polymers in those materials. The acrylonitrile polymers cannot be dispersed in, say, dimethyl formamide, at ordinary temperatures, under normal conditions. When the polymers are introduced into dimethyl formamide at ordinary room temperature, the particles immediately "ball up" or coalesce, forming lumps which cannot be broken readily and are not entirely disintegrated, even after vigorous stirring at high temperatures. In order to effectively disperse the polymers in the solvent, at room temperature, it is necessary to effect the dispersion in the presence of gaseous acidic anhydrides added to the solvent. Even then, complete dissolution of the polymers is only accomplished by stirring the dispersion at high temperatures of well above 100° C. Compositions obtained by mixing the acrylonitrile polymer and solvent, for example, dimethyl formamide, at room temperature, in the absence of the gaseous acidic anhydride, and then stirring the mixture for prolonged periods, whether at temperatures of 100° C. or less, or at excessively high temperatures of around 150° C., are highly colored, usually from a golden to dark brown color, and have little practical value.

In order to overcome these difficulties, and at the same time avoid the obviously undesirable use of gaseous acidic anhydrides in preparing the solutions of the acrylonitrile polymers, special solution-forming procedures have been developed. Such a procedure is described in Patent 2,404,713, and entails the steps of pre-cooling the solvent to 0° C., introducing the acrylonitrile polymer into the cooled solvent whereby a slurry is obtained, permitting the slurry to set to a dough-like mass, raising the temperature of the mass to 150° C., and maintaining the mass at that temperature until dissolution of the acrylonitrile polymer is complete. Aside from being cumbersome and complicating the preparation of the solutions on a large scale for commercial use, that method of preparing the solutions has the drawbacks that both the temperature to which the slurry or dough-like mass is raised, and the period of exposure of the material to the increased temperature are critical to the production of colorless or substantially colorless solutions suitable for commercial use on a wide scale. If the material is raised to a temperature in excess of 150° C., or exposed to a temperature of 150° C. for a time exceeding a critical limit, the resulting solution becomes highly colored.

The primary object of this invention is to provide a new solvent for acrylonitrile polymers which does not have a pronounced swelling action on the polymers at room temperature, and in which the polymers are completely dissolved at temperatures not greater than about 80° C. to produce substantially colorless, commercially acceptable solutions.

Another object is to provide a new solvent for acrylonitrile polymers, in which the polymers are dispersible at room temperature, in the absence of gaseous acidic anhydrides or other dispersion assistants.

I have found that binary mixtures consisting of nitromethane and α-hydroxy, β-trichloro-propionitrile are solvents for the polymers.

The remarkable feature of the binary mixtures consisting of nitromethane and the auxiliary solvent is that they do not exert a swelling effect on the acrylonitrile polymers at ordinary temperatures, and are solvents for the polymers at relatively low temperatures, preferably not higher than about 80° C., so that it now becomes possible, for the first time, to prepare useful solutions of the polymers by a method which is both efficient and commercially practicable.

In accordance with the invention, the particulate acrylonitrile polymer is dispersed in the binary mixture of nitromethane and α-hydroxy-β-trichloropropionitrile, at room temperature, and the polymer is brought to complete solution by stirring the dispersion at room temperature or at elevated temperatures, until dissolution of the polymer is complete. Usually, temperatures not higher than 80° C. are sufficient and, preferably temperatures in the range of about 60 to 80° C. are used. After about three hours, a solution is obtained which is clear, colorless or substantially colorless, and homogeneous.

The acrylonitrile polymer which is brought to solution by dispersing it in the binary mixtures of the invention at room temperature, and thereafter heating the dispersion until complete dissolution may be polyacrylonitrile, or it may be a copolymer or interpolymer, including ternary polymers, of acrylonitrile with polymerizable substances, including such substances containing one or more ethylenic linkages as are copolymerizable with acrylonitrile, such as, for instance, vinyl chloride, vinyl acetate, vinyl propionate and vinyl organic acid esters generally, acrylic and methacrylic acids and their esters and homologs, styrene, isobutene, butadiene, polymerizable vinyl and acrylic compounds generally, polymerizable olefinic and diolefinic hydrocarbons, generally, vinyl pyridines such as 2-vinyl pyridine, 3-vinyl pyridine, 4-vinyl pyridine, and alkyl-substituted vinyl pyridines, etc. In the case of copolymers and interpolymers, the component other than acrylonitrile may be present in the polymer in any amount up to 25% by weight.

The following example in which parts, proportions, and percentages are by weight unless otherwise specified, is illustrative of the invention.

Example 8 parts of polyacrylonitrile were dispersed in a binary mixture consisting of 20 volume per cent. alpha-hydroxy-beta-trichloro-propionitrile and 80 volume percent nitromethane at room temperature. The temperature of the dispersion was then raised to about 75° C. and after stirring at the elevated temperature for about 2 hours, a colorless homogeneous 8 percent solution of the polymer was obtained.

The binary mixture may comprise nitromethane in an amount varying from 50 to 80 volume percent.

The colorless acrylonitrile polymer solution obtained in accordance with this invention may be used as lacquers or coating compositions, for the production of films, sheets, rods, tubing, and containers for various substances including corrosive liquids, oils, greases, etc., or they may be formed into other shaped articles, such as fibers.

Since it is obvious that changes and modifications can be made in the above described details without departing from the nature and spirit of the invention, it is to be understood that the invention is not to be limited to the details described herein, except as set forth in the appended claims.

I claim:

1. A composition of matter comprising an acrylonitrile polymer containing, by weight in the polymer molecule, from 75 to 100% of acrylonitrile and up to 25% of another substance which contains from one to two ethylenic linkages and which is copolymerizable with acrylonitrile, dissolved in a binary mixture consisting of nitromethane and as an auxiliary solvent, alpha-hydroxy-beta-trichloropropionitrile, the nitromethane being present in an amount of from 50 to 80 volume percent based on the total volume of said mixture.

2. A composition of matter comprising an acrylonitrile polymer containing, by weight in the polymer molecule, from 75 to 100% of acrylonitrile and up to 25% of another substance which contains from one to two ethylenic linkages and which is copolymerizable with acrylonitrile, dissolved in a binary mixture consisting of nitromethane and, as an auxiliary solvent, alpha-hydroxy-beta-trichloropropionitrile, the nitromethane being present in an amount of 80 volume percent, based on the total volume of said mixture.

3. The method of preparing solutions of acrylonitrile polymers containing, by weight in the molecule, from 75 to 100% of acrylonitrile and up to 25% of another substance which contains from one to two ethylenic linkages and which is copolymerizable with acrylonitrile, which comprises dispersing the polymer, in particulate form, at room temperature, in a binary mixture consisting of nitromethane and, as an auxiliary solvent, alpha-hydroxy-beta-trichloropropionitrile, the nitromethane being present in an amount of from 50 to 80 volume percent based on the total volume of the mixture, and heating the dispersion, with agitation, until dissolution of the polymer is complete.

4. A method as in claim 3, in which the polymer is dispersed in a mixture of 80 volume percent of nitromethane and 20 volume percent of alpha-hydroxy-beta-trichloropropionitrile.

MASTEN RUFUS DALTON.

No references cited.